April 18, 1939.  J. YOXALL  2,154,882
HYDRAULIC POWER TRANSMISSION DEVICE
Filed June 27, 1936   3 Sheets-Sheet 1
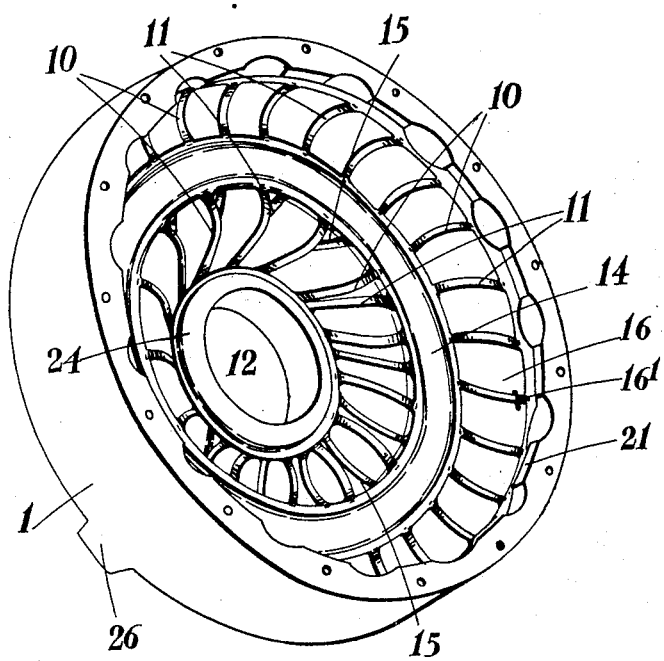
Fig.1.
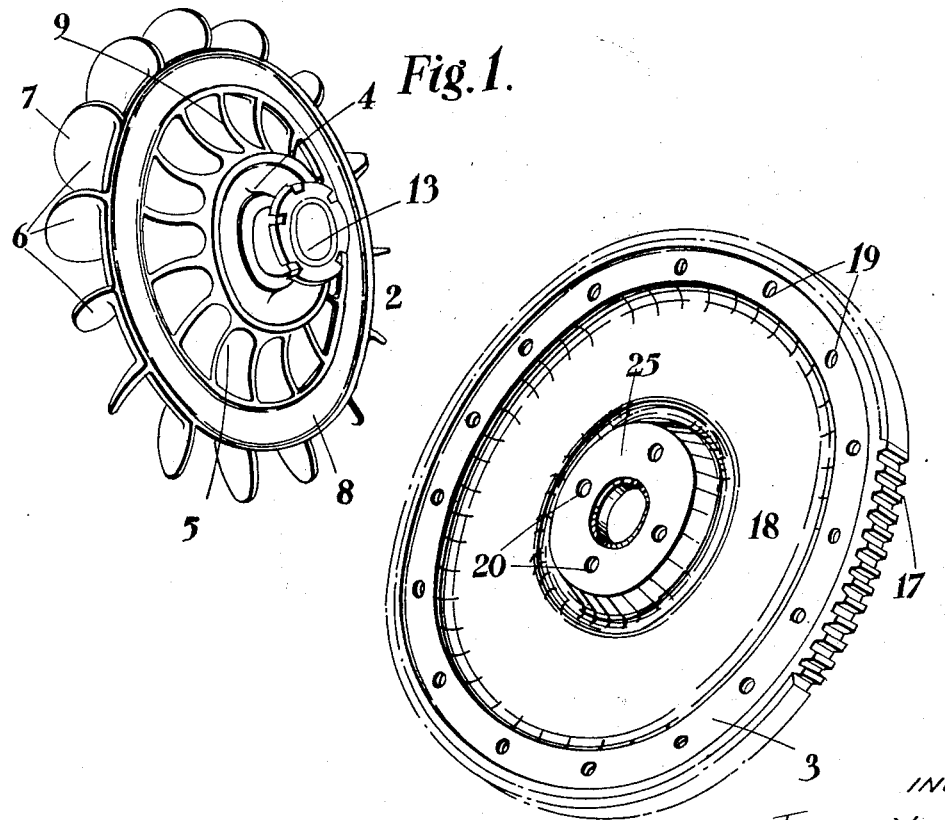
INVENTOR
Joseph Yoxall
BY
ATTORNEY

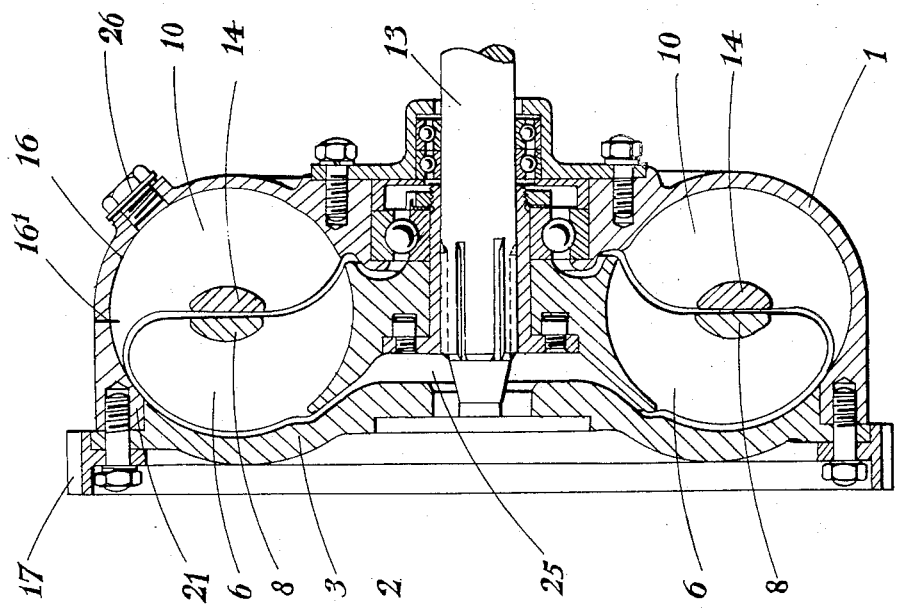
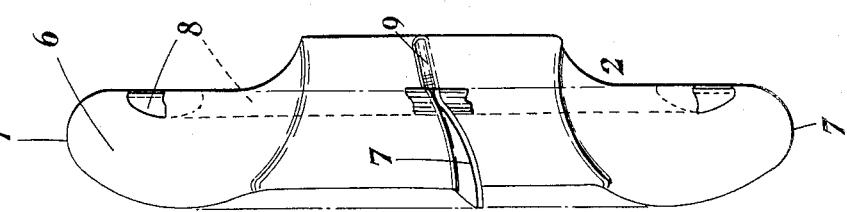
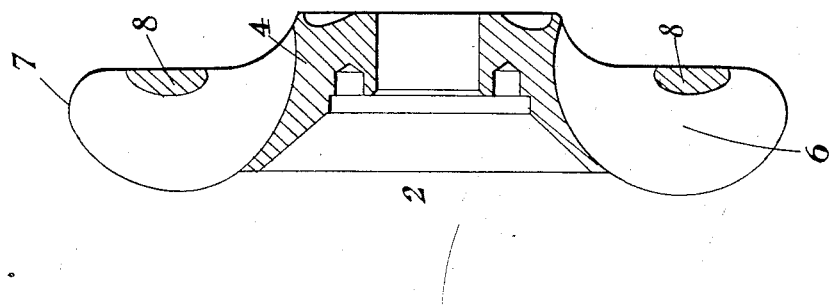

April 18, 1939.  J. YOXALL  2,154,882

HYDRAULIC POWER TRANSMISSION DEVICE

Filed June 27, 1936  3 Sheets-Sheet 3

INVENTOR
Joseph Yoxall
BY
ATTORNEY

Patented Apr. 18, 1939

2,154,882

UNITED STATES PATENT OFFICE 2,154,882

HYDRAULIC POWER TRANSMISSION DEVICE

Joseph Yoxall, Deganwy, North Wales, assignor to Propello Inventions Limited, London, England, a British company Application June 27, 1936, Serial No. 87,792
In Great Britain August 2, 1935

8 Claims. (Cl. 60—54)

The present invention relates to a hydraulic power transmission device of the kind now currently termed a "hydraulic coupling", and comprising two relatively rotatable elements between which torque is communicated, so however, that the torque on the driven shaft can never exceed the torque on the driving shaft.

It is the object of the invention to provide a hydraulic coupling which is satisfactory in operation when mounted between the engine and the rear-wheels of an automobile, both during drive of the car by the engine and during drive of the engine by the car.

In accordance, therefore, with the present invention there is provided a hydraulic coupling having a primary element and a secondary element, the secondary element comprising a hub member from which radiate a plurality of blades inclined to the hub axis, and the primary element comprising a casing having a plurality of webs formed upon an end wall thereof and upon the inner peripheral surface of said casing, the relative number and disposition of the webs and blades being such that when the secondary element is in operative position within said casing and in certain relative angular positions of said elements, at least one of said webs frames a blade with slight clearance, along only one radial edge of said blade and along the whole or part of its tip and at least one of said blades is completely unframed by a web.

A hydraulic coupling made in accordance with the present invention possesses the important practical advantage that under all running conditions of the primary and secondary elements a path is provided for fluid over the tip of a blade and beneath a web in said elements, thereby permitting smooth transmission of drive at all times between the elements.

In order that the present invention may be more fully understood the same will now be described with reference to the accompanying drawings which illustrate one embodiment of hydraulic coupling, and in which:—

Figure 1 shows in perspective view the primary element, secondary element, and cover for the former, of a hydraulic coupling in accordance with the invention;

Figure 2 is an axial cross-section of the secondary element shown in Figure 1;

Figure 3 is a side elevation, partly broken away, of the element shown in Figure 2;

Figure 6 is an axial cross-section of the primary and secondary elements in assembled position.

Figure 4:
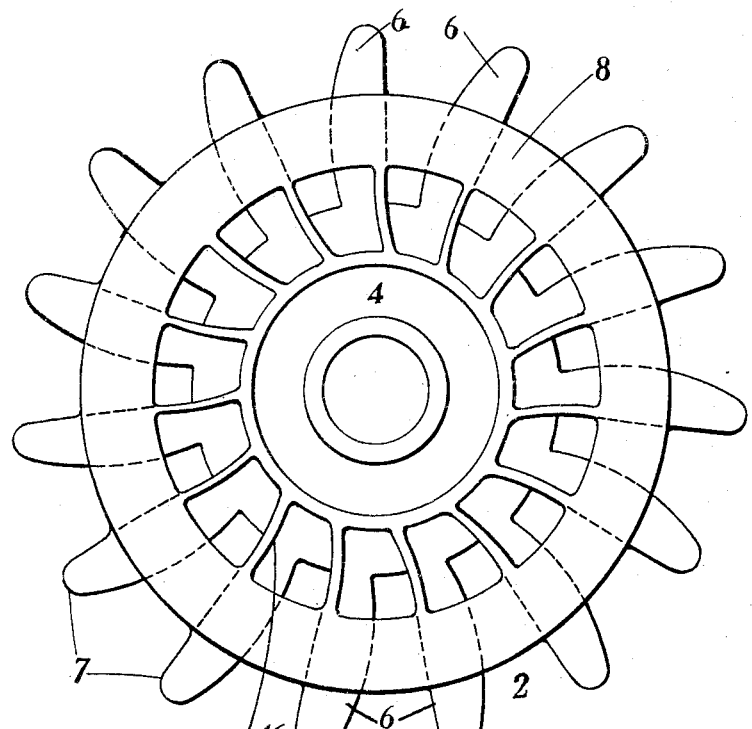
Figure 4 is a front elevation of the secondary element shown in Figures 2 and 3.

Referring now to the drawings, it must first be explained, with respect to Figure 1, that the primary element 1 of the hydraulic coupling consists of an interiorly webbed dished member, and that the secondary element 2 is adapted to be housed within said dished member so as to be capable of rotation therewithin, the cover-plate (and starter drive member) 3 being secured on the open end of element 1, which latter is then partially filled with oil, and constitutes a two-part hydraulic coupling. Attention is now directed to the particular formation of the secondary and primary elements. The former comprises a hub portion 4 into which merge the roots 5 of a plurality of (as shown, fifteen) blades 6; these blades are inclined with respect to the axis of hub 4, and have each a curved tip 7, which, as hereinafter explained, co-operates with the primary element 1. Substantially mid-way between the tips 7 and roots 5 of the blades 6, is formed a circular strengthening rib 8 which is smooth on its outer surface, flush with the adjacent edges 9 of blades 6, and is either flat or slightly dished, to co-operate with a similar rib member formed on the primary element 1, as will hereinafter appear. As already explained, element 1 is dished, and it is of sufficient depth to provide a series of compartments as well as to accommodate the secondary element 2. These compartments are formed by a plurality of webs or vanes cast integrally with the inner end wall of the element 1; these webs are of two types—first, there are fourteen large webs, indicated by reference 10, and alternating with them fourteen small webs, indicated by reference 11.

The large webs 10 extend upwards from the inner end wall (the centre of which is open to provide a circular hole 12 through which shaft 13 of element 2 extends when the latter is in position) of element 1, and are complementary in shape to the edges 9 of blades 6 of element 2. Integral with said webs 10 there is formed a circular strengthening rib 14 of the same dimensions as rib 8 of element 2. Between each adjacent pair of large webs 10 is cast a small web 11, also connected with rib 14, the difference between webs 10 and 11 being merely that whereas the former are substantially complementary, in their shape between rib 14 and hole 12, to that of the blades of element 2 between its rib 8 and hub 4, the webs 11 are cut away so as to leave substantial clearance between their edges 15 and the edges 9 of the blades 6 when element 2 is in operative position. Between rib 14 and the peripheral wall 16 of element 1 there thus extend twenty-eight webs, each of which is inclined to the axis of element 1 (to correspond with the inclination of blades 6 of element 2) and each of which extends not only to a position 16' on the wall 16 corresponding to the tips 7 of blades 6, but extends beyond that position so as to curve around at least part of the curved tip of a blade 6 when element 2 is in position within element 1. The cover plate 3 is merely a thick disc having a toothed edge 17 adapted to engage with the starter-pinion of an automobile in which the hydraulic coupling is mounted. The plate 3 is slightly dished at 18 to provide a predetermined working clearance between the plate and the rear edges of blades 6; holes 19 permit the attachment of plate 3 to element 1, and other holes 20 enable it to be secured to a power input shaft.

Figure 5:
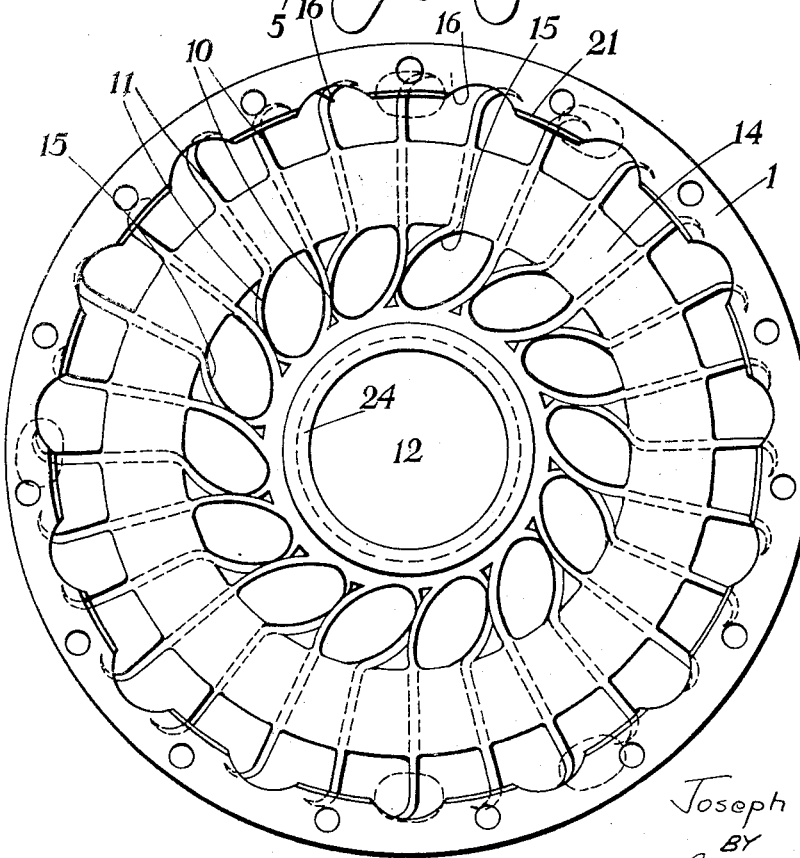
Figure 5 is a front elevation (looking toward the interior) of the primary element shown in Figure 1.

Figures 2 to 5 of the drawings show one practical arrangement of the blades 6, ribs 8 and 14, and webs 10, 11. It will be seen that a hollow space lies beneath rib 14 between each pair of webs 10, 11; also that the peripheral wall 16 of element 1 forms a flange 21. In order to permit introduction of element 2 into element 1, flange 21 is cut away at fifteen points, corresponding to the tips of blades 6, and it will be seen that the extent to which webs 10, 11 are each adapted to lie over and around the tip of a blade 6 is determined by the machining of the inner periphery of flange 21. The inclination to the axis, and the shape of blades 6 is clearly seen in Figures 3 and 4, whilst Figure 5 shows the manner in which the webs 10, 11 are formed on the end wall of element 1. Figure 6 shows the relative positions of elements 1, 2 and 3 when assembled and also shows clearly the manner in which blades 6 are each adapted to be framed in turn by each of the webs upon relative rotation of elements 1 and 2.

Returning to Figure 1 of the drawings, it will be understood that element 2 is turned over from the position shown and placed within element 1 so that the smooth surfaces of ribs 8 and 14 abut as seen in Figure 6; in this position two series 10, 11 can in turn each partially frame a blade 6, such framing occurring only when element 2 is rotated into a position such that a blade edge 9 lies adjacent a web. Even in this position of element 2, the framing of a blade 6 by a web 10 is not complete, since the whole of the rear edge of each blade 6 lies adjacent to the smooth inner face of cover-plate 3. The coupling is normally about two-thirds full of a suitable transmission liquid. When the complete coupling is mounted in an automobile transmission system it appears, according to experiments which I have made, that when primary element 1 is rotated during starting up of the system, at a speed of approximately 300 to 400 revolutions per minute, when the centrifugal forces acting on liquid are low, that said liquid within element 1 is thrown by blades 10 of element 1 against the blades 6 of element 2 and imparts the whole or part of this momentum to element 2, and having lost said momentum passes, at low speeds of element 1, into the free space designated 25 lying between hub 4 and the adjacent surface of cover-plate 3, whence said liquid is once again caught up by the blades of element 1 and, as the speed of the latter increases, flung with greater force against the blades of element 2, until the latter has acquired such a speed that the whole of the liquid is centrifugally spread out at the inner periphery of the coupling. During the starting stage, described above, the fluid can pass between blades 6, (which are not closed at their rear edges) and to space 25, and as a result of the "open-circuit" coupling construction according to the present invention a smoother take-up of power is obtained, when starting from rest, than in known "closed-circuit" types of coupling in which blades formed on both primary and secondary members are provided with an integral backing member which prevents through-flow of fluid between and past the blades during relative rotation of the elements of the coupling and constrains the fluid to pass directly from one element to the other. In practice, element 1 is connected to the engine and element 2 to the driven wheels of the car in which the flywheel is mounted. One or more suitable filling plugs 26 are provided in element 1 for the introduction thereinto of oil to serve as the coupling liquid.

It is to be remarked that, as shown in the drawings, there are fifteen blades on the turbine element and fourteen co-operating large webs or vanes on the impeller; these numbers are preferred, as the result of practical trials, to ensure that when one of the blades is framed by a web the other blades shall be unframed by webs. By this arrangement a path is provided for fluid over the tips of said unframed blades and beneath the non-coincident webs.

What I claim is:—

1. Hydraulic coupling comprising a primary element, and a secondary element, said secondary element comprising a hub member, a plurality of substantially helically formed blades radiating from said hub member and inclined to the hub axis, said primary element comprising a casing and a plurality of webs formed upon an end wall of said casing upon the inner peripheral surface thereof, alternate webs of the primary element being cut back near their inner radial ends, the relative number and disposition of said webs and said blades being such that when the secondary element is in operative position within said casing and in certain relative angular positions of said elements, at least one of said webs frames a blade with slight clearance along only one radial edge of said blade and along at least part of its tip and at least one of said blades is completely unframed by a web.

2. Hydraulic coupling comprising a primary element, and a secondary element, said secondary element comprising a hub member, a plurality of blades radiating from said hub member and inclined to the hub axis, said primary element comprising a casing and a plurality of webs formed upon an end wall of said casing upon the inner peripheral surface thereof, said primary element being formed at its periphery with a flange defining an opening of less diameter than the diameter of said secondary element adapted to receive a cover-plate and said flange having a plurality of indentations to permit said secondary element to be introduced into said primary element, the relative number and disposition of said webs and said blades being such that when the secondary element is in operative position within said casing and in certain relative angular positions of said elements, at least one of said webs frames a blade with slight clearance along only one radial edge of said blade and along at least part of its tip and at least one of said blades is completely unframed by a web.

3. Hydraulic coupling comprising a primary element, and a secondary element, said secondary element comprising a hub member, a plurality of substantially helically formed blades radiating from said hub member and inclined to the hub axis, said primary element comprising a casing and a plurality of webs formed upon an end wall of said casing upon the inner peripheral surface thereof, a dished cover-plate being attached to said primary element and formed with a dished smooth inner surface giving a predetermined clearance from the adjacent edges of the blades of said secondary element when the coupling is assembled, the relative number and disposition of said webs and said blades being such that when the secondary element is in operative position within said casing and in certain relative angular positions of said elements, at least one of said webs frames a blade with slight clearance along only one radial edge of said blade and along at least part of its tip and at least one of said blades is completely unframed by a web.

4. Hydraulic coupling comprising a primary element, a cover plate therefor and a secondary element, said secondary element comprising a hub member, a plurality of substantially helically formed blades radiating from said hub member and inclined to the hub axis, said primary element comprising a casing and a plurality of webs formed upon an end wall of said casing upon the inner peripheral surface thereof, the blades of said secondary element being open at their rear edges and a free space provided between the hub of said secondary element and said cover-plate so that liquid can, under certain conditions of working, pass from said blades to said free space, the relative number and disposition of said webs and said blades being such that when the secondary element is in operative position within said casing and in certain relative angular positions of said elements, at least one of said webs frames a blade with slight clearance along only one radial edge of said blade and along at least part of its tip and at least one of said blades is completely unframed by a web.

5. Hydraulic coupling comprising a primary element, and a secondary element, said secondary element comprising a hub member, a plurality of substantially helically formed blades radiating from said hub member and inclined to the hub axis, said primary element comprising a casing and a plurality of webs formed upon an end wall of said casing upon the inner peripheral surface thereof, a dished cover-plate being attached to said primary element and formed with a dished smooth inner surface giving a predetermined clearance from the adjacent edges of the blades of said secondary element when the coupling is assembled, and the blades of said secondary element being open at their rear edges and a free space provided between the hub of said secondary element and said cover-plate so that liquid can, under certain conditions of working, pass from said blades to said free space, the relative number and disposition of said webs and said blades being such that when the secondary element is in operative position within said casing and in certain relative angular positions of said elements, at least one of said webs frames a blade with slight clearance along only one radial edge of said blade and along at least part of its tip and at least one of said blades is completely unframed by a web.

6. Hydraulic coupling comprising a primary element, and a secondary element, said secondary element comprising a hub member, a plurality of substantially helically formed blades radiating from said hub member and inclined to the hub axis, said primary element comprising a casing and a plurality of webs formed upon an end wall of said casing upon the inner peripheral surface thereof, a circular strengthening rib being attached to said webs of said primary element, and a strengthening rib of substantially equal size to said first-mentioned rib being attached to said blades of said secondary element, said ribs each having a smooth surface lying adjacent a similar surface of the other rib when said primary and secondary elements are in operative position, a dished cover-plate being attached to said primary element and formed with a dished smooth inner surface giving a predetermined clearance from the adjacent edges of the blades of said secondary element when the coupling is assembled, the relative number and disposition of said webs and said blades being such that when the secondary element is in operative position within said casing and in certain relative angular positions of said elements, at least one of said webs frames a blade with slight clearance along only one radial edge of said blade and along at least part of its tip and at least one of said blades is completely unframed by a web.

7. Hydraulic coupling comprising a primary element, a cover plate therefor and a secondary element, said secondary element comprising a hub member, a plurality of substantially helically formed blades radiating from said hub member and inclined to the hub axis, said primary element comprising a casing and a plurality of webs formed upon an end wall of said casing upon the inner peripheral surface thereof, a circular strengthening rib being attached to said webs of said primary element, and a strengthening rib of substantially equal size to said first-mentioned rib being attached to said blades of said secondary element, said ribs each having a smooth surface lying adjacent a similar surface of the other rib when said primary and secondary elements are in operative position, the blades of said secondary element being open at their rear edges and a free space provided between the hub of said secondary element and said cover-plate so that liquid can, under certain conditions of working, pass from said blades to said free space, the relative number and disposition of said webs and said blades being such that when the secondary element is in operative position within said casing and in certain relative angular positions of said elements, at least one of said webs frames a blade with slight clearance along only one radial edge of said blade and along at least part of its tip and at least one of said blades is completely unframed by a web.

8. Hydraulic coupling comprising a primary element, and a secondary element, said secondary element comprising a hub member, a plurality of substantially helically formed blades radiating from said hub member and inclined to the hub axis, said primary element comprising a casing and a plurality of webs formed upon an end wall of said casing upon the inner peripheral surface thereof, a circular strengthening rib being attached to said webs of said primary element, and a strengthening rib of substantially equal size to said first-mentioned rib being attached to said blades of said secondary element, said ribs each having a smooth surface lying adjacent a similar surface of the other rib when said primary and secondary elements are in operative position, a dished cover-plate being attached to said primary element and formed with a dished smooth inner surface giving a predetermined clearance from the adjacent edges of the blades of said secondary element when the coupling is assembled, and the blades of said secondary element being open at their rear edges and a free space provided between the hub of said secondary element and a cover-plate so that liquid can, under certain conditions of working, pass from said blades to said free space, the relative number and disposition of said webs and said blades being such that when the secondary element is in operative position within said casing and in certain relative angular positions of said elements, at least one of said webs frames a blade with slight clearance along only one radial edge of said blade and along at least part of its tip and at least one of said blades is completely unframed by a web.

JOSEPH YOXALL.